(12) United States Patent
Woop

(10) Patent No.: US 6,217,308 B1
(45) Date of Patent: Apr. 17, 2001

(54) MULTICAVITY BLOW MOLDING MACHINE FOR PRODUCING HOLLOW BODIES

(75) Inventor: Heiko Woop, St. Augustin (DE)

(73) Assignee: Fischer-W. Muller Blasformtechnik GmbH, Troisdorf (DE)

( * ) Notice: Subject to any disclaimer, the term of this patent is extended or adjusted under 35 U.S.C. 154(b) by 0 days.

(21) Appl. No.: 09/515,638

(22) Filed: Feb. 29, 2000

(30) Foreign Application Priority Data

Mar. 1, 1999 (DE) .............................................. 199 08 723

(51) Int. Cl.⁷ .................................................. B29C 49/04
(52) U.S. Cl. .................................. 425/174.8 E; 264/454; 264/465; 264/540; 425/532
(58) Field of Search .................................. 264/454, 465, 264/540; 425/174.8 E, 532

(56) References Cited

U.S. PATENT DOCUMENTS 3,068,511 * 12/1962 Ahlbeck et al. ...................... 264/454
4,000,233 * 12/1976 Gilbert ................................ 264/542

FOREIGN PATENT DOCUMENTS

| 197 49 320 | 5/1999 | (DE) . |
| 0 570 393 B1 | 12/1994 | (EP) . |
| WO 95/21735 | 8/1995 | (WO) . |

* cited by examiner

Primary Examiner—Robert Davis
(74) Attorney, Agent, or Firm—Herbert Dubno

(57) ABSTRACT

A blow-molding apparatus has an ionization bar extending along the row of extruded parisons to dissipate electrostatic charge thereon. The ionization bar comprises a conductive strip received in an insulating holder and preferably a copper laminate strip whose longitudinal edge is turned toward the parisons and can be formed with an array of pointed teeth.

4 Claims, 2 Drawing Sheets

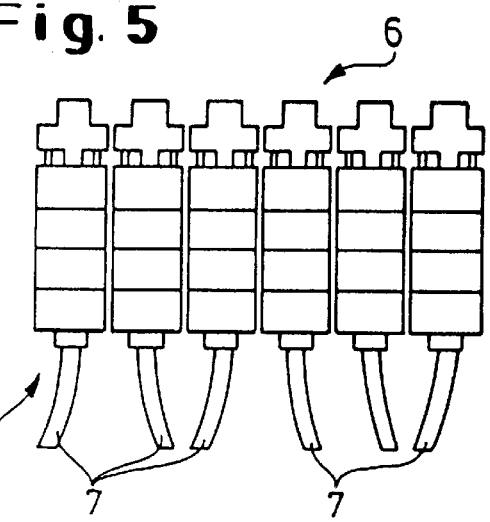
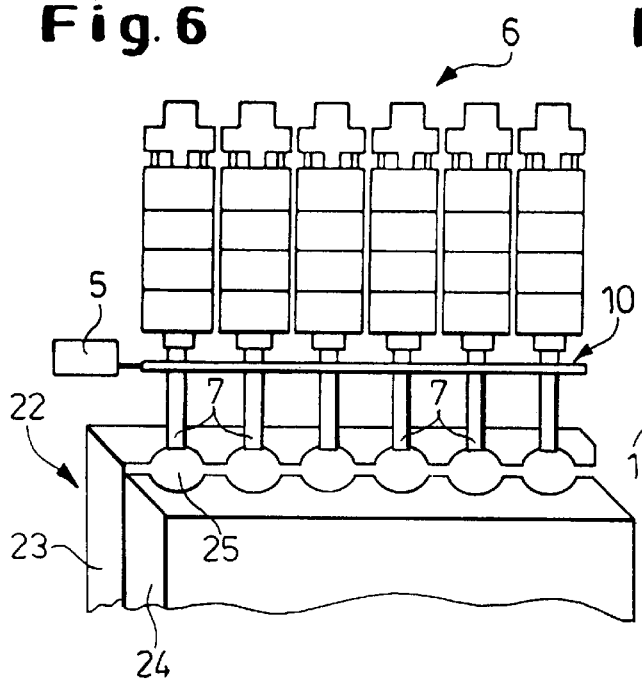
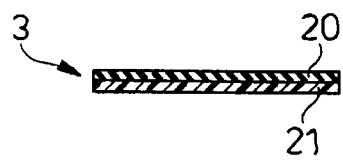
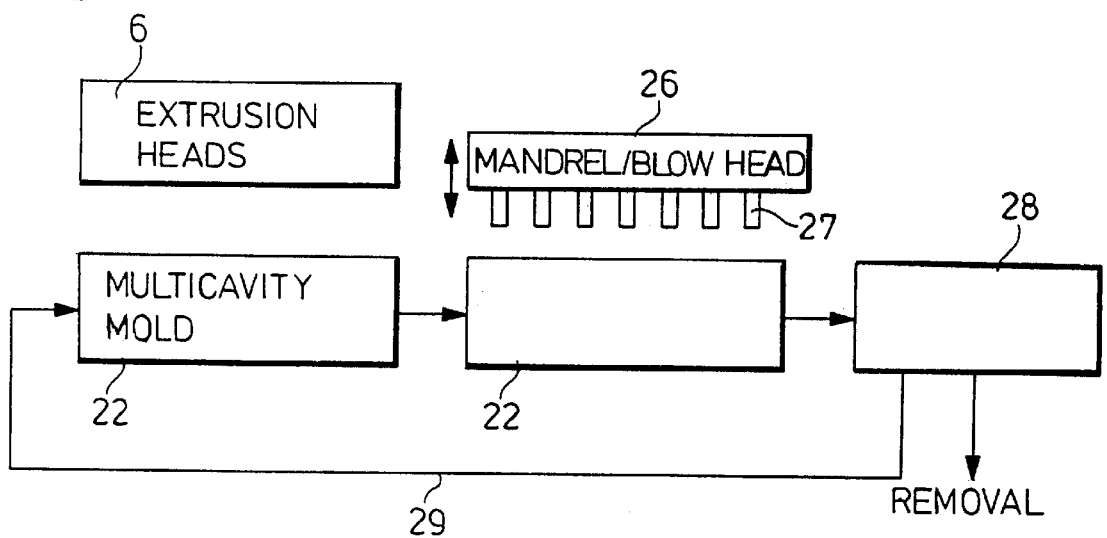

MULTICAVITY BLOW MOLDING MACHINE FOR PRODUCING HOLLOW BODIES

FIELD OF THE INVENTION

My present invention relates to a multicavity blow molding machine for producing hollow articles and, more particularly, to improvements in dissipating electrostatic charge carried by parisons upon extrusion in multicavity blow molding machines.

BACKGROUND OF THE INVENTION

In the production of bottles, tubes, vials and other tubular articles in multicavity blow molding machines from synthetic resin materials, a multicavity mold can be positioned beneath a row of extrusion heads so that respective parisons can be extruded downwardly into the open mold cavities. The mold cavities can be closed, i.e. by closing the multicavity blow mold, mandrels can be inserted into the parisons in the cavities and the parisons can be blown to the shape of the mold cavities. The parisons can be calibrated in tubular shaping portions of the mold cavity.

The closed blow mold can be displaced to the blowing and calibrating station in which the blowing mandrels are inserted into the parisons and, after blowing, the blow mold can be opened, the articles removed and the blow mold returned to alignment with the extrusion heads to receive new parisons.

Between the extrusion heads and the mold cavities, the dangling extruded parisons or tubes carry electrostatic charge.

Apparatus of this type is described, for example, in EP 0 570 393 B1 and the brochure entitled in English "Long Stroke Blow Molding Machines" published in January 1996 by Fischer W. Müller, Blasformtechnik, GmbH of Troisdorf, Germany.

In these blow molding machines the tubular extruded parisons may hang over a considerable distance between the extrusion head and the blow mold.

Because of the static charges developed on the parisons, the parisons tend to swing pendulum-fashion relative to the vertical and frequently cannot pass uniformly or reproducibly into the respective cavities. As a consequence, the wall thickness distribution in the mold cavity may be nonuniform and the product quality may diminish.

It has been proposed to solve this problem by providing an ionization device along side the extruded tubes or parisons and, for that purpose, a commercially available ionization bar has been provided at a high voltage of say 7 kV to ionize the atmosphere around the tubes or parisons utilizing a relatively low current of 0.25 mA. The bar carries a multiplicity of short electrodes in an insulating body, the electrodes projecting by about 2–4 mm from this body. An individual electrode may thus be turned toward each of the parisons and can develop a high voltage and generates positive and negative charge carriers which, in turn, are picked up by air molecules. In practice, however, this system has not been fully satisfactory since the desired charge dissipation often does not occur and efforts to enhance the charge dissipation by displacing the air forcibly brings about a one-sided cooling of the parisons which itself is detrimental and leads to defective products.

OBJECTS OF THE INVENTION

It is the principal object of the present invention to provide a blow molding apparatus, particularly of the type described, with improved capabilities with respect to the dissipation of charge on the extruded parisons or tubes which are produced in the extrusion heads and which are to be received in the blow-molding cavities.

Another object of the invention is to provide an improved blow molding machine which ensures a better feed of the parison tubes into the blow molding.

Still another object of this invention is to provide an improved electrode system for eliminating electrostatic charge on extruded parisons for the production of blow molding articles.

SUMMARY OF THE INVENTION

These objects are attained, in accordance with the invention in a blow molding apparatus comprising:

a multicavity blow-molding station having a row of cavities for receiving respective parisons for blow molding same;

a row of extrusion heads located above the blow mold for extruding respective parisons in a row downwardly into the respective cavities; and an ionization bar extending alongside the parisons between the heads and the blow-molding station for neutralizing electrostatic charges on the parisons resulting from extrusion thereof, the ionization bar comprising an insulating holder and an electrically conductive strip mounted in the holder and forming a single continuous electrode extending along the row of parisons and having a longitudinal edge turned toward the parisons.

Thus in the system of the invention the ionization bar is in the form of a single long electrode mounted in an insulating holder and having the configuration of an electrically conductive strip, preferably a copper laminate strip, with a longitudinal edge juxtaposed with and turned toward the extruded parsons, extending transversely thereto and along the row of parisons.

Investigation has shown, quite surprisingly, that drawbacks associated with the individual types of separate and spaced apart wire-like electrodes are eliminated by the use of a substantially continuous edge of such a strip and that the discharge of the extruded parisons is far more uniform. It appears that the greater area of the electrically conductive strip, together with the fact that the edge is turned toward the parisons, ensures an improved field distribution in the region of the parisons that promotes the more uniform discharge thereof. It is also possible that the strip itself provides a greater electrical field strength than is the case with the individual electrodes or wires of the earlier system.

In any event with the invention charge dissipation can be effected to a higher degree and improved efficiency, utilizing the improved electrode construction than was hitherto the case.

According to a feature of the invention, the edge of the strip turned toward the parisons is formed with teeth and especially with pointed teeth uniformly distributed along the edge with the flanks of the teeth converging toward the tips and the parison. The strip can be manufactured inexpensively and tends to uniformly discharge the parisons regardless of the tooth spacing and the distribution of the parisons in the respective row.

The distribution of teeth along the edge, moreover, contributes to the uniformity of the discharge field and at the same time ensures a high density of the electrical field lines or lines of equipotential.

BRIEF DESCRIPTION OF THE DRAWING

The above and other objects, features, and advantages will become more readily apparent from the following description, reference being made to the accompanying drawing in which:

FIG. 5 is a side elevational view of a portion of a blow-molding apparatus showing the effect of the electrostatic charge;

FIG. 6 is a view similar to FIG. 5 but illustrating additional parts of the blow-molding apparatus and showing the ionization bar in place.

FIG. 7 is a cross section through the strip of the ionization; and

FIG. 8 is a diagram showing the blow-molding operation.

SPECIFIC DESCRIPTION

Figure 1:
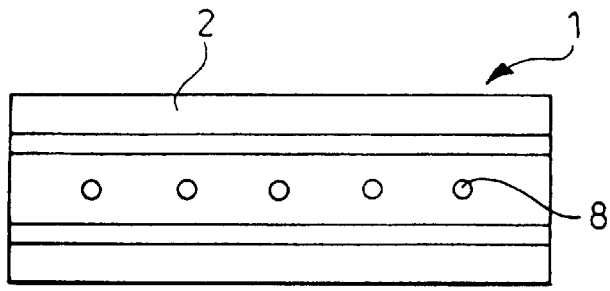
FIG. 1 is a side elevational view of a conventional ionization bar for use with a blow-molding apparatus.
Figure 2:
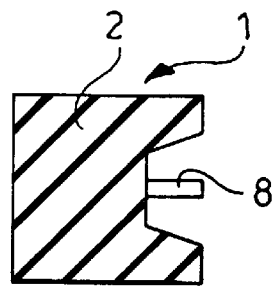
FIG. 2 is a cross sectional view through this bar.

FIGS. 1 and 2 show a conventional ionization bar for uniform distribution of high voltage symmetrically, for example, for use in a blow-molding machine. Here, however, relatively small cylindrical electrodes 8 are provided with diameters of about 1 mm and are anchored in an insulating material 2 so that the electrodes project only about 2–4 mm from the insulator.

Figure 3:
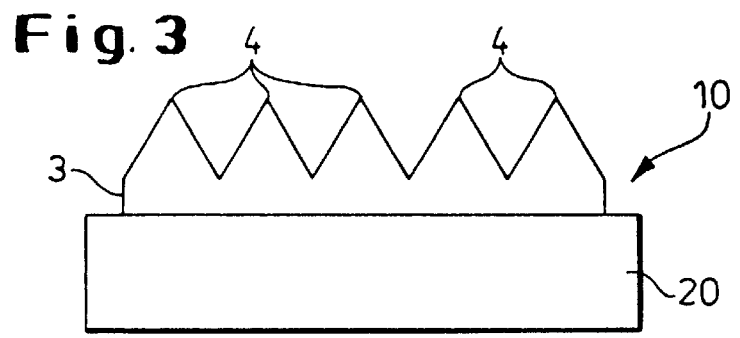
FIG. 3 is a plan view of an ionization bar in accordance with the invention.
Figure 4:
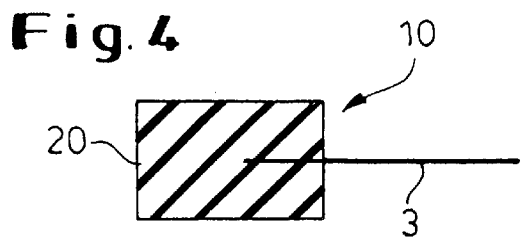
FIG. 4 is a cross sectional view through this bar.

In FIG. 3, I have shown an ionization bar 10 according to the invention and which comprises, in an insulating housing 20, a large-area continuous electrode in the form of a strip 3. The strip 3 may be a copper laminate strip (see FIG. 7) with a copper layer 20 laminated on an insulating layer 21. The strip 3 can have, along its free longitudinal edge turned toward the parisons, pointed teeth 4. If active ionization is to be induced by the electrode 3 or the bar 10, the electrode 3 can be connected to a high voltage source 5. Otherwise it can be grounded to the housing of the blow molding machine.

A comparison of FIGS. 5 and 6 will clarify the effect of the ionization bar 10.

FIG. 5 shows the heads 6 of a blow molding machine which can have, in the illustrated case, six extrusion heads, each of which extrudes a respective tubular synthetic resin parison 7. It is common to provide up to sixteen such heads and to accommodate up to sixteen such parisons in the blow mold 22 (FIG. 6) which is shown to have two halves 23 and 24 defining respective blow molding cavities 25.

As can be seen from FIG. 5, because of the unavoidable static charge build-up on the parisons 7, when long parisons are extruded, they tend to swing from side to side and do not have a predetermined orientation with respect to the mold cavities 25 located therebelow. The result is that the parisons do not pass uniformly into the respective mold cavity and cannot be blown to finished articles of uniform wall thickness.

As can be seen from FIG. 6, when the ionization bar 10 is provided with the points or tips 4 turned toward the parisons 7 and hence away from the viewer in FIG. 6, the larger electrode 3 in the form of the strip provides a high electrical field strength which eliminates the static charge on the parisons 7 so that they are fed rectilinearly and without swinging from side to side into the respective cavities 25.

As will be apparent from FIG. 8, the multicavity mold 22 can then be closed, the mold moved into alignment with a mandrel and blowing head 26, the mandrels 27 of which fit into the parisons in the mold cavities, and the articles are then blown so that each parison is expanded until it conforms to the mold cavity. The resulting bottles, vials or the like are removed at 28 and the multicavity mold 29 is returned to the station to receive a new supply of parisons.

I claim:

1. A blow-molding apparatus comprising:

a multicavity blow-molding station having a row of cavities for receiving respective parisons for blow molding same;

a row of extrusion heads located above the blow mold for extruding respective parisons in a row downwardly into the respective cavities; and an ionization bar extending alongside said parisons between said heads and said blow-molding station for neutralizing electrostatic charges on said parisons resulting from extrusion thereof, said ionization bar comprising an insulating holder and an electrically conductive strip mounted in said holder and forming a single continuous electrode extending along said row of parisons and having a longitudinal edge turned toward said parisons.

2. The blow molding apparatus defined in claim 1 wherein said edge is formed with teeth having points turned toward said parisons.

3. The blow-molding apparatus defined in claim 2 wherein said conductive strip is a copper laminate strip.

4. The blow-molding apparatus defined in claim 1 wherein said conductive strip is a copper laminate strip.

* * * * *